United States Patent

Peale et al.

[11] Patent Number: 5,838,438
[45] Date of Patent: Nov. 17, 1998

[54] METHOD OF TIME-RESOLVING FOURIER-TRANSFORM SPECTROSCOPY TO ALLOW INTERFEROGRAM SAMPLING AT UNEVENLY SPACED PATH-LENGTH DIFFERENCES.

[75] Inventors: Robert E. Peale, Oviedo; Henry Weidner, Orlando, both of Fla.

[73] Assignee: University of Central Florida, Orlando, Fla.

[21] Appl. No.: 785,016

[22] Filed: Jan. 17, 1997

[51] Int. Cl.$^6$ .................................................. G01B 9/02
[52] U.S. Cl. .......................................... 356/346; 356/358
[58] Field of Search .................. 356/345, 356, 356/358, 346

[56] References Cited

U.S. PATENT DOCUMENTS 5,486,918   1/1996   Nagashima ............................. 356/346

Primary Examiner—Robert Kim
Attorney, Agent, or Firm—Brian S. Steinberger; Law Offices of Brian S. Steinberger

[57] ABSTRACT

A low cost method of adding time-resolving capability to commercial Fourier-transform spectrometers with a continuously scanning Michelson interferometer. This invention is specifically designed to eliminate noise and artifacts caused by mirror-speed variations in the interferometer. The method exists as two parts: 1) a novel timing scheme for synchronizing the transient events under study with the digitizing by an analog-to-digital converter, and 2) a mathematical algorithm for extracting the spectral information from the recorded data. The novel timing scheme is a modification of the well known interleaved, or stroboscopic, method. It achieves the same timing accuracy, signal-to-noise ratio, and freedom from artifacts as step-scan time-resolving Fourier spectrometers by locking the sampling of the interferogram to a stable time base rather than to the occurrences of the HeNe fringes. The necessary path-length-difference information at which samples are taken is obtained from a record of the mirror speed. The resulting interferograms with uneven path-length-difference spacings are transformed into optical frequency space by least-squares fits of periodic functions.

20 Claims, 17 Drawing Sheets

Event-locked data acquisition of time-resolved spectral information

Flow of processes during a measurement with free-running excitation source

METHOD OF TIME-RESOLVING FOURIER-TRANSFORM SPECTROSCOPY TO ALLOW INTERFEROGRAM SAMPLING AT UNEVENLY SPACED PATH-LENGTH DIFFERENCES.

This invention is a method and apparatus for time resolved spectroscopy in the Far infrared through ultraviolet wavelength regions. This invention was funded in part under Grant No. F49620-95-1-0075 of the United States Airforce Office of Scientific Research(AFOSR/NE).

This application is a continuation of Provisional patent application Ser. No. 60/020,617 filed Jun. 26, 1996.

BACKGROUND AND PRIOR ART

A goal of optical spectroscopy is to determine the spectral content of electromagnetic radiation after it has interacted with, or been emitted by, some sample of interest. Typical interactions include reflection, scattering and transmission. Emission processes include luminescence.

Common spectrometers fall into two general classes, dispersive instruments and interferometers. The subject invention relates to interferometers in particular continuously scanning ones. A Michaelson Interferometer splits a light beam into two paths, varies the length of one path, recombines the split beams, and measures in the mixed signal the intensity versus the path difference.

FIG. 1 illustrates a prior art Fourier transform spectroscopy(FTS). Light 13 emitted from (or having interacted with) a sample 12(such as but not limited to a gas, liquid, or surface) is modulated by a Michelson interferometer 14 as a function of path-length difference. The interferometer 14 modulates the light. The modulated intensity is digitized at evenly spaced moving-mirror positions and collected as an interferogram 16 which contains complete spectral information of source 13. The digitized interferogram 16 is analyzed using a Fast Fourier Transform(FFT) 18 to obtain the spectrum 20. The spacing between the sampling locations is determined by the interference pattern of a HeNe laser that shares the same interferometer optics as the signal of interest. According to Nyquist's sampling theorem, a free spectral range of up to 7899 cm$^{-1}$ can be characterized with one sample per laser fringe. Higher optical frequencies require more samples per fringe. Spectral resolution is determined by the length of the moving mirror scan, i.e. the maximum path-length difference.

Time-resolved Fourier transform spectroscopy (TRFTS) adds time-resolution to the proven advantages of Fourier transform spectroscopy (FTS), namely the combination of wide spectral coverage, high resolving power, and good signal to noise ratios. Time-resolved Fourier spectroscopy requires the acquisition of all interferogram points at the desired time during some transient change in the properties of the sample 12. With the exception of very slow transients, it is impossible to obtain all the necessary interferogram points from a single transient since the path length difference of the interferometer can only be varied at a finite rate. The standard method to overcome this problem is to create one transient per interferogram point.

Step scan interferometers set their mirrors to each path-length difference to be sampled, and (at least) one transient is initiated and recorded at each of these positions. Such instruments are presently the only Fourier spectrometers that offer high performance time resolving capability over a wide range of time constants. However, step scan interferometers are substantially more expensive and complex than continuous-scan interferometers.

In contrast to step-scan interferometers, continuously scanning interferometers take data "on the fly". The temporal HeNe interference pattern triggers a continuous stream of requests to sample the interferogram. The transient signal needs to be prepared with the proper time delay at the time of each sampling request. A number of TRFTS data acquisition schemes have been developed to deal with the continuous stream of sampling requests issued by continuously-scanning interferometers. For transients which have both a short time constant and a creation rate equal to the sampling rate, a transient can be initiated at each sample request and the actual sampling happens the desired delay time later. See J. J. Sloan and E. J. Kruus, "Time-Resolved Fourier Transform Spectroscopy", in Time Resolved Spectroscopy, R. J. H. Clark and R. E. Hester eds. (Wiley, New York, 1989), Chap. 5, p. 219–253. For even faster transients, asynchronous TRFTS is possible. See K. Masutani, H. Sugisawa, A. Yokota, Y. Furukawa, and M. Tasumi, Appl. Spectroscopy. 46, 560 (1992). Further, see U.S. Pat. Nos. 5,196,903 and 5,251,008 and 5,021,661 to Masutani. If the transients last longer than the time between sampling requests (even at slow mirror speeds) and/or they cannot be repeated at a high enough rate, one has to use an interleaving scheme, in which sample requests are skipped and multiple mirror sweeps are used to collect a single complete interferogram for a particular time delay. This interleaved scheme is described in: J. J. Sloan and E. J. Kruus, "Time-Resolved Fourier Transform Spectroscopy", in Time Resolved Spectroscopy, R. J. H. Clark and R. E. Hester eds. (Wiley, New York, 1989), Chap. 5, p. 219–253.; H. Weidner and R. E. Peale, "Time Resolved Fourier Spectroscopy for Activated Optical Materials", Appl. Optics (1996) Vol. 35, pp.2849–2856. and S. A. Rogers and S. R. Leone, Appl. Spectroscopy, 47, 1430 (1993). A key feature of this TRFTS system, which also limits its performance, is the rigid locking of the interferogram sampling to the interference pattern of the HeNe reference laser. This not only limits the timing accuracy and hence the time resolution, but is also a significant source of noise. See H. Weidner and R. E. Peale, "Time Resolved Fourier Spectroscopy for Activated Optical Materials", Appl. Optics (1996) Vol. 35, pp. 2849–2856.

FIG. 2 illustrates a prior art timing diagram 30 of TRFTS using the interleaved scheme. Transient events(changes in the optical properties of the sample 12) are triggered, 60, in fixed relation to the HeNe reference 40. The variable delay is chosen (and then kept fixed) to initiate an event 60 at a desired time before a series of ADC samples 80 which are also locked to the HeNe reference (dashed lines). The sampling of the interferogram is locked to the HeNe reference, assuring accurate knowledge of the sampling positions which are evenly dispersed in path-length-difference space. However, mirror speed variations cause interferogram points to be recorded at uneven time intervals. Mirror speed variations make the prediction of the arrival times of the reference pulses uncertain, which results in a timing jitter with respect to the event initiation. This timing jitter causes an uncertainty in the spectral content of the transient at the actual time of sampling. It can also cause uncertainty in the total (modulated plus unmodulated) signal seen by the detector. If the total signal at the expected sample time is changing at a rate dI/dt, a timing error of $\Delta t$ translates into an intensity error of $\Delta I = \Delta t\, dI/dt$, which appears as noise in the interferogram. This causes noisy spectra and, if the mirror speed variations are not entirely random, artifacts. The solution would seem to be perfect stabilization of the mirror speed. Sophisticated systems like the Bomem DA8 Fourier transform spectrometer achieve stability up to 2% of the intended speed. See H. Weidner and R. E. Peale, "Time Resolved Fourier Spectroscopy for Activated Optical Materials", Appl. Optics 35, pp.2849–2856,(1996). However, further stabilization, even by only a small factor, is likely accompanied by large expense, more or less permanent changes to the hardware, and a reduction in flexibility for varied spectroscopic applications. Timing jitter from mirror speed variations therefore will remain a significant source of noise and artifacts for realistic continuous-scan TRFTS systems based on prior art systems.

Various patents are related to continuous scan TRFTS but fail to solve the above described problems. See U.S. Pat. Nos.: 4,086,652 and 4,138,727 to Mantz; 4,684,255 to Ford; 4,636,780 to Thomas et al.; 4,922,754 to Horne et al.; 5,414,510 to Schultz et al.; 5,418,804 to Zhiglinsky et al.; 5,450,196 to Turner; 5,422,194 to Satoh et al.;and 5,422,721 to Ryan.

SUMMARY OF THE INVENTION

The first objective of the present invention is to provide a method of continuous-scan TRFTS that avoids artifacts and noise caused by mirror-speed variations.

The second object of this invention is to provide a method of time-resolved spectroscopy with continuously-scanning interferometers which improves the timing accuracy to the level of step-scan systems.

The third object of this invention is to provide a method of time-resolved spectroscopy with continuously-scanning interferometers which does not require substantial changes to the interferometer hardware (other than the optional addition of an optical retarder plate for systems which use a white light interferogram to identify a fixed path-length difference position of the scanning interferometer).

The fourth object of this invention is to provide a novel data acquisition timing scheme method for time-resolved spectroscopy with continuously-scanning interferometers.

The fifth object of this invention is to provide a novel algorithm for transforming interferograms into spectral data which does not require evenly spaced interferogram data points.

The invention encompasses a new method of time-resolved spectroscopy with continuously-scanning interferometers which improves the timing accuracy to the level of step-scan systems(limited by the analog-to-digital converters and timing electronics). It does not require changes to the interferometer hardware (besides the optional addition of an optical retarder plate for certain commercial Fourier spectrometers) and can be added to any continuously-scanning interferometer. (The issue of the Optical retarder plate is described in H. Weidner and R. E. Peale, "Time Resolved Fourier Spectroscopy for Activated Optical Materials", accepted by Appl. Optics (1996) and J. T. McWhirter and A. J. Sievers, Appl. Spectrosc. 45, 1391 (1991).) An implementation with 200 ns resolution is described. It uses standard electronics to keep the cost low, a novel timing scheme for data acquisition, and a novel algorithm to obtain the spectra.

Further objects and advantages of this invention will be apparent from the following detailed description of a presently preferred embodiment which is illustrated schematically in the accompanying drawings.

BRIEF DESCRIPTION OF THE FIGS.

FIG. 5b is the data acquisition synchronization program steps for the overview set-up of FIG. 5a.

FIG. 5c is the analysis program for data obtained with the experimental set-up of FIG. 5a.

FIG. 7 shows a spectrum of a multi-line $Ar^+$ laser, set to medium power and chopped by an acousto-optical modulator, taken 10 $\mu s$ after beam turn-on.

Figure 10A:
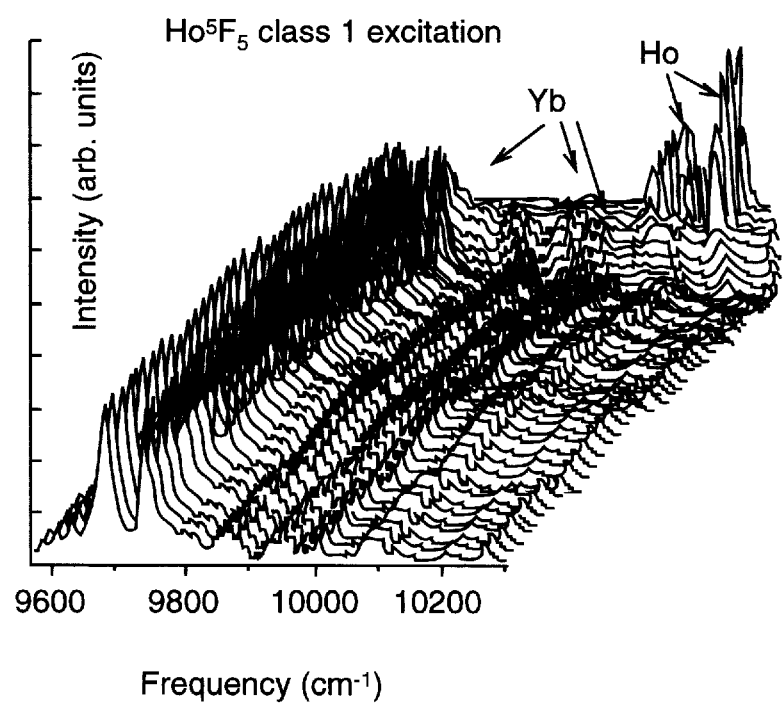
FIG. 10a shows 80K emission spectra of $Ho^{3+}$ and $Yb^{3+}$ emission in $KYF_4$.
Figure 10B:
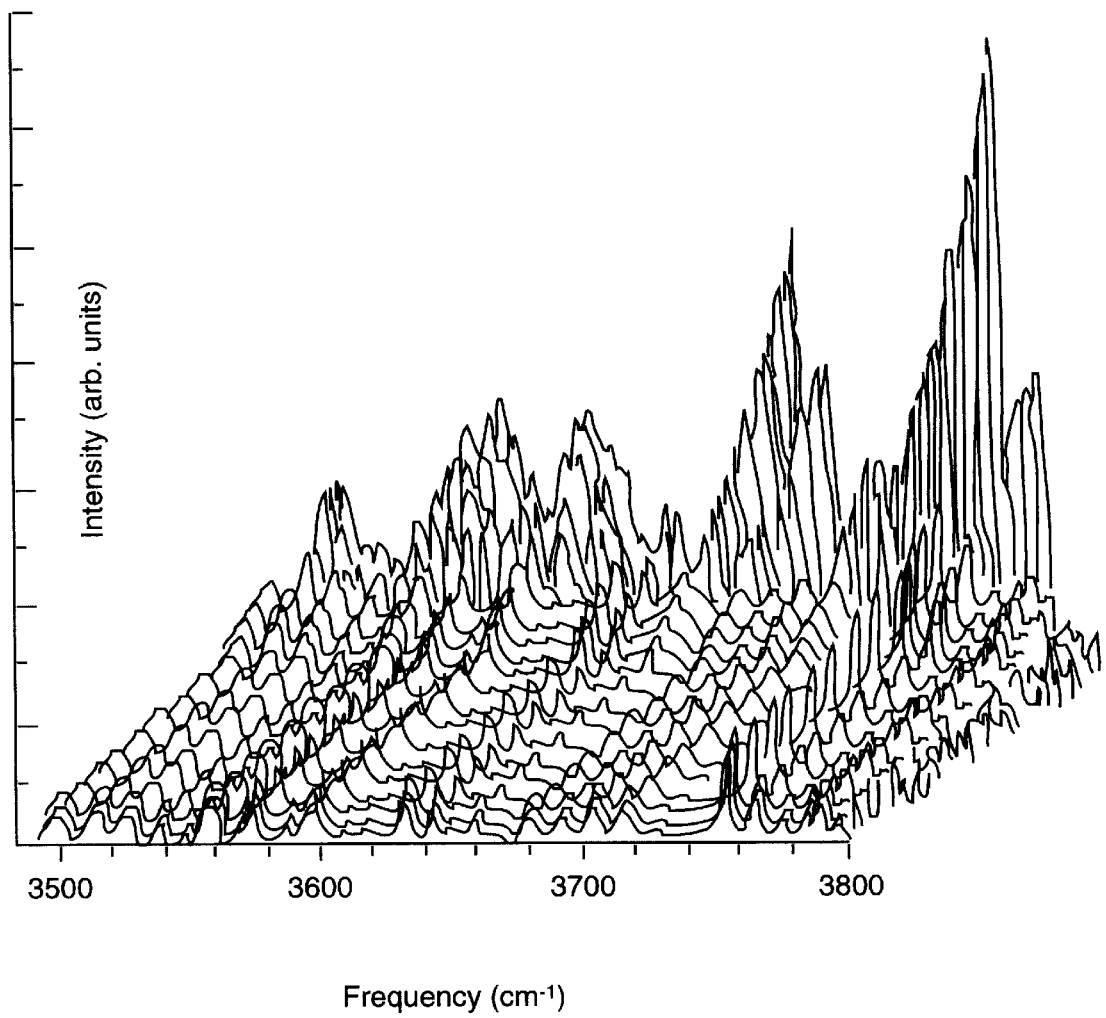

FIG. 10b a graph of intensity versus frequency for the 3 $\mu m$ emission of $Er^{3+}$:YLF in the mid IR(infrared) spectral region.

Figure 11:
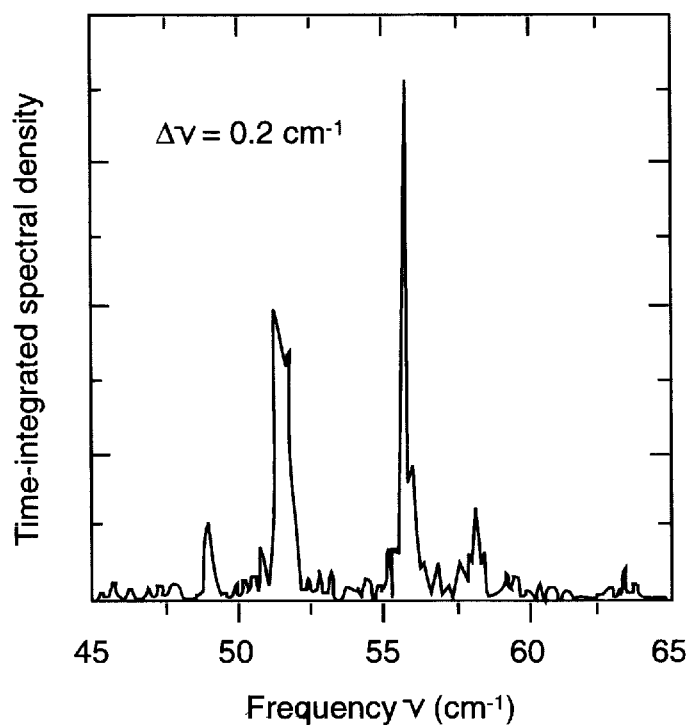

FIG. 11 shows a Far-infrared emission from a pulsed p-Ge source at a resolution of 0.2 $cm^{-1}$.

Figure 1:
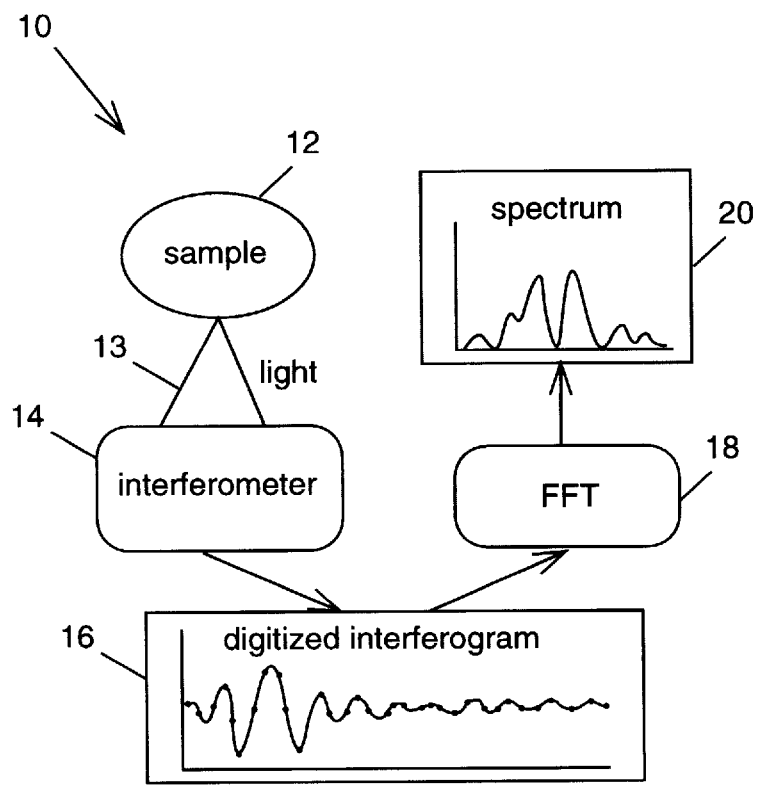
FIG. 1 illustrates a prior art Fourier transform spectroscopy(FTS).
Figure 2:
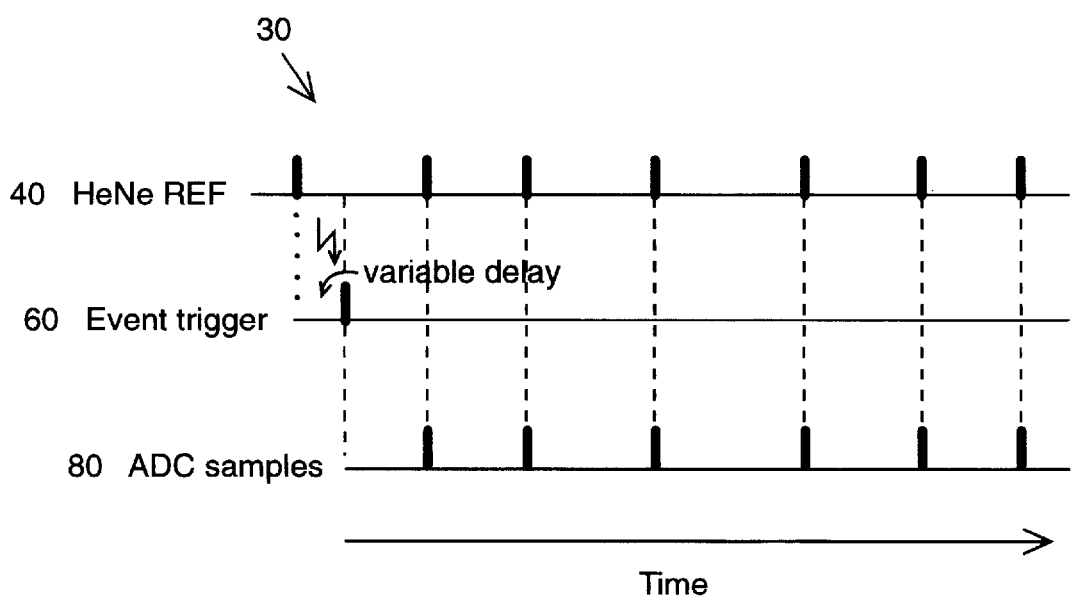
FIG. 2 illustrates a prior art timing diagram of interleaved time-resolved Fourier spectroscopy(TRFTS).
Figure 3:
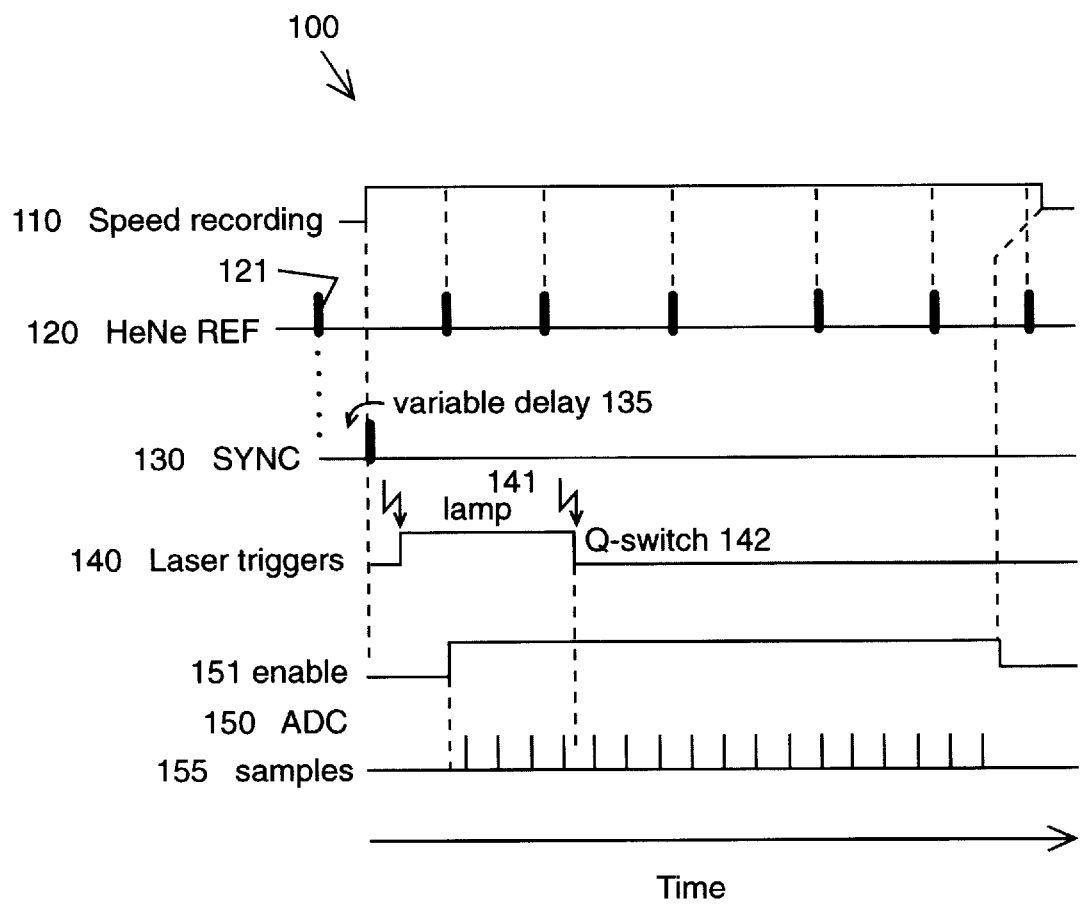
FIG. 3 shows a timing diagram for the novel Event-locked TRFTS of the subject invention.
Figure 12:
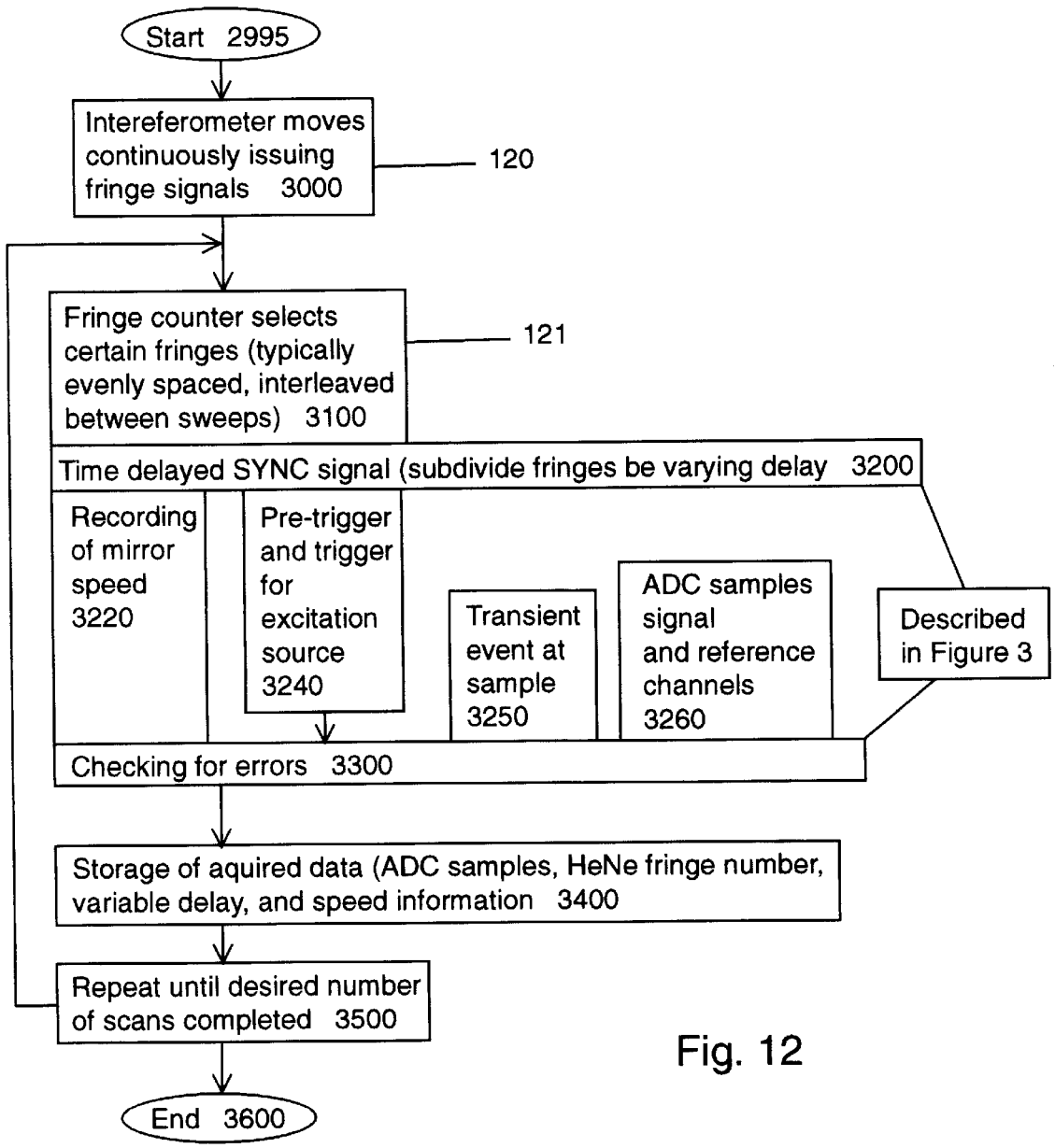

FIG. 12 is a flow chart of the operating steps of the invention which include the synchronization steps of FIG. 3 during a measurement with a triggered excitation source.

Figure 13:
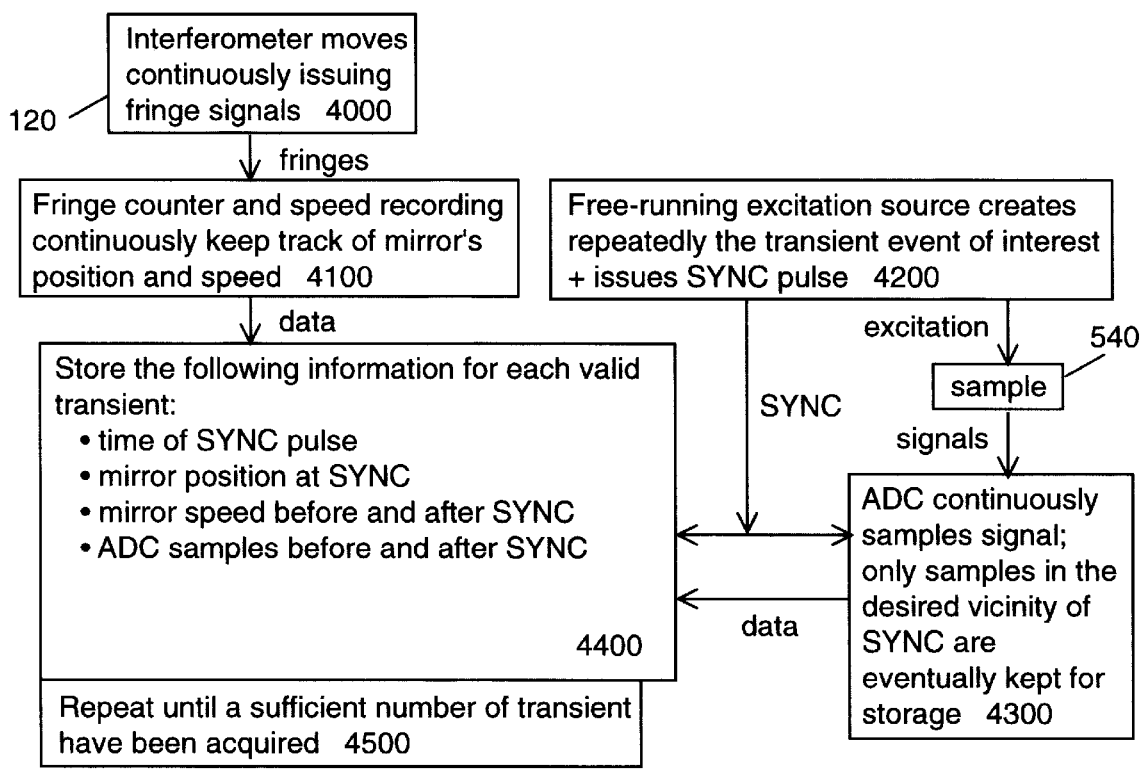

FIG. 13 is a flow chart of the operating steps of the invention which include the synchronization steps of FIG. 3 during a measurement with a free-running excitation source.

Figure 14:
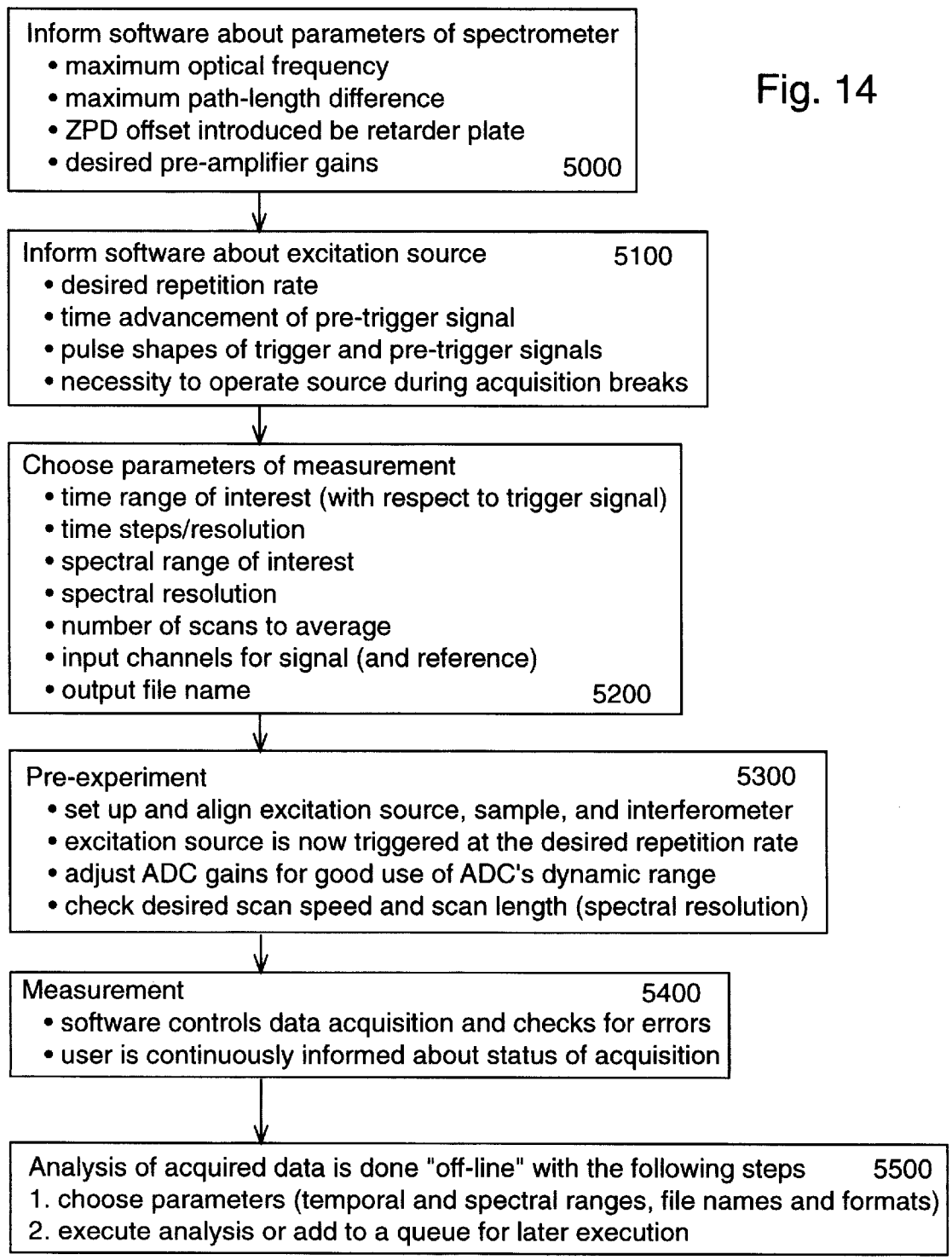

FIG. 14 shows the overall operating algorithm steps required to prepare and execute a time-resolved measurement using the presently preferred embodiment.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Our solution to the problem of timing jitter from mirror speed variations is to decouple the ADC samples from the temporal HeNe fringe pattern. Instead, we sample the transient signal exactly at the times of interest independently of the exact mirror position. The (unevenly spaced) path-length differences at which the samples were taken are established by measuring the speed of the mirror during the sampling. The sampling of the interferogram and the speed recording are now locked to the transient event rather than to the HeNe reference, hence the name "Event-locked TRFTS".

FIG. 3 shows a timing diagram 100 for the novel Event-locked TRFTS of the subject invention. The speed recording 110, HeNe REF 120, SYNC 130, Laser triggers 140 and ADC 150 are plotted over time. The acquisition of interferogram information 155 is locked to a SYNC event 130 and decoupled from the HeNe laser fringe pattern 120. Connection to the path-length difference is established numerically from a record of the arrival times of HeNe reference pulses 120 measured during 110 the sampling period of the ADC 151. Triggering of a Q-switched laser 140 is indicated as an example of an excitation scheme for transient events. In FIG. 3, the SYNC signal 130 starts the recording of the speed information (to be later described) and two counters, which control the laser and the ADC. Both counters have a programmable delay and a programmable pulse width. The beginning of the laser-control pulse 141 may be used to prepare each transient. Its end 142 initiates the transient. In our experimental set-up(described in greater detail in reference to FIG. 5), these are the firing of the laser flash lamps 141 and the actual laser shot by triggering the Q-switch 142, respectively. The ADC control counter sets the length of the sampling window 151 and its relative position to the initiation of the transient 142. The ADC is paced with a quartz stabilized time base at a rate which is independent of the HeNe laser fringe frequency. It can be very useful to position part of the sampling window 151 before the initiation of the transient 142 as it is shown in FIG. 3. Zero signal levels or spectral information immediately before the transient can be recorded during this time.

Referring to FIG. 3, the SYNC signal can be derived from practically any source (for instance a ready-signal from a free-running laser). It is, however, necessary to know the number of the REF pulse 121 just before SYNC 130 to determine the path-length-difference information from the recorded speed and the times of the ADC samples 155. If the excitation source is triggerable, a REF pulse 121 can be used to initiate the SYNC signal 130 as shown in FIG. 3. By selecting an appropriate sequence of REF pulses 120, one can spread the transient events, and thus the acquired samples, almost evenly over the length of the mirror scan. A free-running laser would require a considerably larger number of transient events to assure measurements near all necessary path-length differences. An additional delay 135 between the counter-selected REF pulse 121 and the SYNC pulse 130 allows an even finer spread of events. The delay 135 may be varied over a number of mirror sweeps to obtain a sequence of measurements with transient events slightly shifted with respect to the HeNe fringe pattern, thus acquiring several samples per HeNe fringe. Such sampling is necessary for near IR, visible, and UV measurements. The number of different time delays 135 can be chosen such that the Nyquist critical frequency exceeds the maximum frequency present in the interferogram. Since there is no restriction of this number, for instance to integer powers of two, the number of samples and transient events may be kept minimal. The delay 135 is realized by a digital counter which causes discreteness of the actual delay times and may prevent division of the HeNe fringes into exactly equal intervals. However, this is not a problem since the exact path-length difference of all samples is determined. A potential loss of spectral information caused by an unequal division can be avoided by using a sufficiently large number of different delays.

Figure 4:
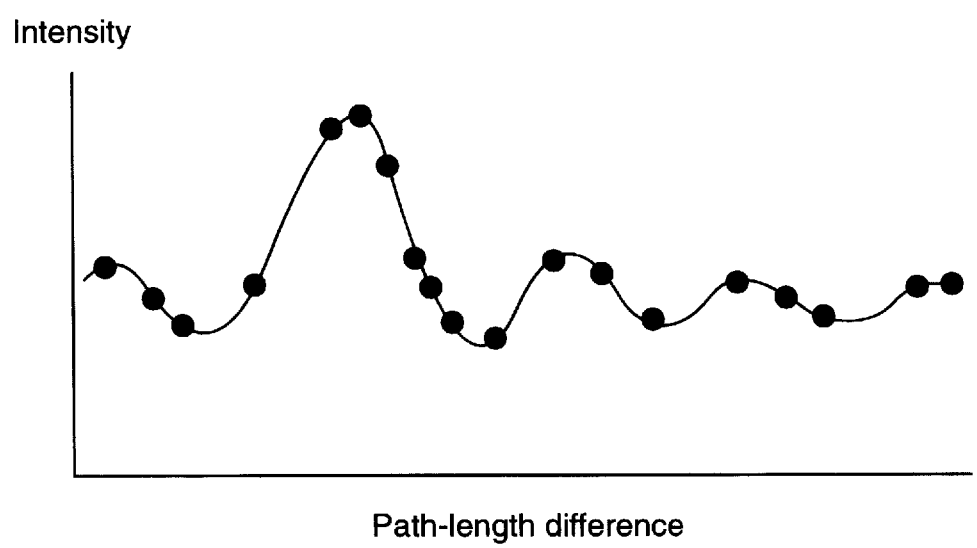
FIG. 4 illustrates an interferogram with uneven sample spacing, as it would be obtained with large variations of the mirror speed for sampling at constant time intervals.

The recorded speed information is a list of time differences $\{t_i\}$ for $i=0 \ldots n-1$, where $t_0$ is the time between the SYNC pulse 135 and the first REF pulse 121 and subsequent $t_i$ are the times between the ith and (i+1)th REF pulses. The routine "spline" from the publication; Teukolsky, W. T. Vetterling, and B. P. Fannery, Numerical Recipes in C: The Art of Scientific Computing, W. H. Press, (Cambridge University Press, Cambridge 1994), 3rd ed., Chap. 13., p. 575–584, has been modified to accept the data as recorded and to utilize the fact that the dependent variable is the fringe number i. The cubic spline interpolation done by this routine delivers a continuous function representing fringe number vs. time. This function is evaluated at the time delay of an ADC sample 155 and gives the path-length advancement since the last REF pulse 121 before SYNC 135. The actual path-length difference is found by adding the (integer) fringe number of the last REF pulse 121 before SYNC 135. This procedure is repeated for all interferogram points for the desired time delay. The result is a list of interferogram intensities yi with their respective pathlength differences xi. A hypothetical plot of such an interferogram is shown in FIG. 4, where the uneven spacing between points has been exaggerated.

The analysis of unevenly spaced interferogram data cannot directly rely on the usual fast Fourier transform (FFT) to convert interferogram information into spectral information (spectral density and phase) since FFT weights the data on a "per interval" basis. In contrast, least-squares (LS) fitting weights the data on a "per point" basis and can handle unequal spacing. See S. A. Teukolsky, W. T. Vetterling, and B. P. Fannery, Numerical Recipes in C: The Art of Scientific Computing, W. H. Press, (Cambridge University Press, Cambridge 1994), 3rd ed., Chap. 13., p. 575–584. The following will show how the extraction of a spectrum can be done with LS fitting instead of FFT. There are two main steps: finding the spectral density, and estimation and removal of unwanted phase information. Both steps rely on LS fits of functions $A\cos(2\pi\sigma x - \phi)$ to the interferogram data, where x is the path-length difference and A and $\phi$ are functions of the optical frequency $\sigma$. The offset $\phi$ arises from frequency dependent differences in optical path length caused mainly by asymmetries in the beam splitter. Therefore, $\phi$ varies only slowly with $\sigma$ and a low resolution double-sided interferogram is sufficient to characterize the phase function $\phi(\sigma)$.

An efficient method is to begin data acquisition a distance $x_z$ (~1 mm) before x=0 and to use only data in the range $[-x_z, x_z]$ to determine $\phi$. The application of the LS fitting is fairly straight forward. The goal is to minimize the sum:

$$S_{sq}=\Sigma_i[y_i-A\cos(2\pi\sigma x_i-\phi)]^2$$

which is to be taken over all (N) interferogram points $(x_i, y_i)$ in the desired range. Using the definitions p=A cos $\phi$ and q=A sin $\phi$, we can simplify fer calculations:

$$S_{sq}=\Sigma_i[y_i-p\cos 2\pi\sigma x_i-q\sin 2\pi\sigma x_i)]^2$$

The minimum of $S_{sq}$ is found by solving $\delta S_{sq}/\delta p=0$ and $\delta S_{sq}/\delta q=0$ simultaneously. With the definitions:

$$Y_C=\Sigma_i y_i \cos(2\pi\sigma x_i) \quad (1)$$

$$Y_S=\Sigma_i y_i \sin(2\pi\sigma x_i) \quad (2)$$

$$C_2=\Sigma_i \cos(2\pi\sigma 2x_i) \quad (3)$$

$$S_2=\Sigma_i \sin(2\pi\sigma 2x_i) \quad (4)$$

one obtains:

$$p=2(Y_c(N-C_2)-Y_S S_2)/(N^2-C_2^2-S_2^2) \quad (5)$$

$$q=2(Y_S(N+C_2)-Y_C S_2)/(N^2-C_2^2-S_2^2) \quad (6)$$

from which we can find the phase $\phi$ as:

$$\phi=\arctan(q/p), \text{ for } p\geq 0 \quad (7)$$

$$\arctan(q/p)+\pi, \text{ for } p<0$$

Treating $\phi$ now as a known constant, $\delta S_{sq}/\delta A=0$ yields $$A=2(Y_C \cos \phi + Y_S \sin \phi)/(N+C_2 \cos 2\phi + S_2 \sin 2\phi) \quad (8)$$

which represents the phase-corrected spectral density at a frequency σ. Evaluating A for the frequencies of interest gives the spectrum. In the limit of equal spacing of interferogram points ($\Delta x$) and spectrum points ($\Delta\sigma=1/(N\Delta x)$), we find $C_2 \to 0$ and $S_2 \to 0$, which reduces p and q to the real and imaginary parts of a complex FFT, respectively. In the same limit the expression for A becomes the real part of the product of an FFT with $e^{-i\phi}$. The latter is also the result of the Mertz method of obtaining phase corrected spectra. Hence, our LS method is equivalent to established methods of spectral analysis in the case of equally spaced interferogram points. Furthermore, the similarities between the LS fitting result and regular FFT point the way for implementation of apodizations and other procedures proven useful for the analysis of interferograms. D. Lafontaine, Application notes IMZ9641, (Bomem Inc., Quebec,1986) explains the Mertz method.

The evaluation of Eqs. 1–4 can be done in a number of ways. The resemblance to the equations of the discrete Fourier transform is only superficial since the summation is over irregularly spaced data points. The straightforward calculation of a spectrum with N points requires on the order of N×N calls to trigonometric functions, which is very time consuming. The uneven spacing of interferogram points prohibits the use of efficient recurrence relations. A solution was found in S. A. Teukolsky, W. T. Vetterling, and B. P. Fannery, Numerical Recipes in C: The Art of Scientific Computing, W. H. Press, (Cambridge University Press, Cambridge 1994), 3rd ed., Chap. 13., p. 575–584. The evaluation of Eqs. 1–4 with full machine accuracy is replaced by an approximation using Lagrange interpolation, i. e. the value of a trigonometric function $g(x_i)$ (the sines and cosines in Eqs. 1–4) at an arbitrary path-length difference $x_i$ is approximated from values of this function at nearby points $\{x'_k\}$ on a regular grid:

$$g(x_i) = \Sigma_k w_k(x_i) \, g(x'_k)$$

with the Lagrange coefficients $$W_k(x_i) = \Pi_{l \neq k}(x_i - x'_l)/\Pi_{l \neq k}(x'_k - x'_l).$$

Eqs. 1–4 can now be approximated:

$$\Sigma_i y_i g(x_i) \approx \Sigma_i y_i [\Sigma_k w_k(x_i) g(x'_k)] \quad (9)$$
$$= \Sigma_k [\Sigma_i w_k(x_i) g(x'_k)]$$
$$= \Sigma_k y'_k g(x'_k)$$

with $y_k = \Sigma_i y_i \, w_k(x_i)$. For Eqs. 3 and 4, one sets y=1. Hence, the sum over the irregular interferogram on the left side has been replaced by a sum over a regular mesh (right side). The latter is now suitable for evaluation using FFT which requires only on the order of $N \log_2 N$ operations. The original interferogram points are "spread" over the regular mesh by finding the $y_k$ before the sine and cosine transforms, which can then be evaluated simultaneously using a complex FFT. Now the relationship between the LS fitting result (Eq. 5) and the usual FFT method are even more obvious. The numerator in Eq. 5 is the phase corrected result of a complex FFI from a regular-mesh approximation of the measured interferogram. The denominator is a correction factor which depends on the actual distribution of the samples.

The evaluation using Eq. 9 and FFT is already faster than the straightforward calculation of Eqs. 1–4 at an interferogram length of 100 points. For interferograms of usual size, the method can be more than 100 times faster. The speed advantage comes at the expense of larger memory requirements (32 MBytes for spectra up to 22000 $cm^{-1}$ at 0.1 $cm^{-1}$ resolution). Conventional FFT based on equally spaced interferograms without data reduction requires only $\frac{1}{8}^{th}$ of the memory and is approximately 16 times faster. However, computers with sufficient RAM and speed to make these considerations a trivial concern are now widely available.

The acquisition hardware is based on a personal computer (486DX2) 510 hosting a 16 bit ADC expansion card 516 (DAS1800HR) from Keithley Metrqbyte, and a generic counter expansion card 512 such as a CIO-CTRIO card manufactured by Computer Boards, Inc.

Figure 5A:
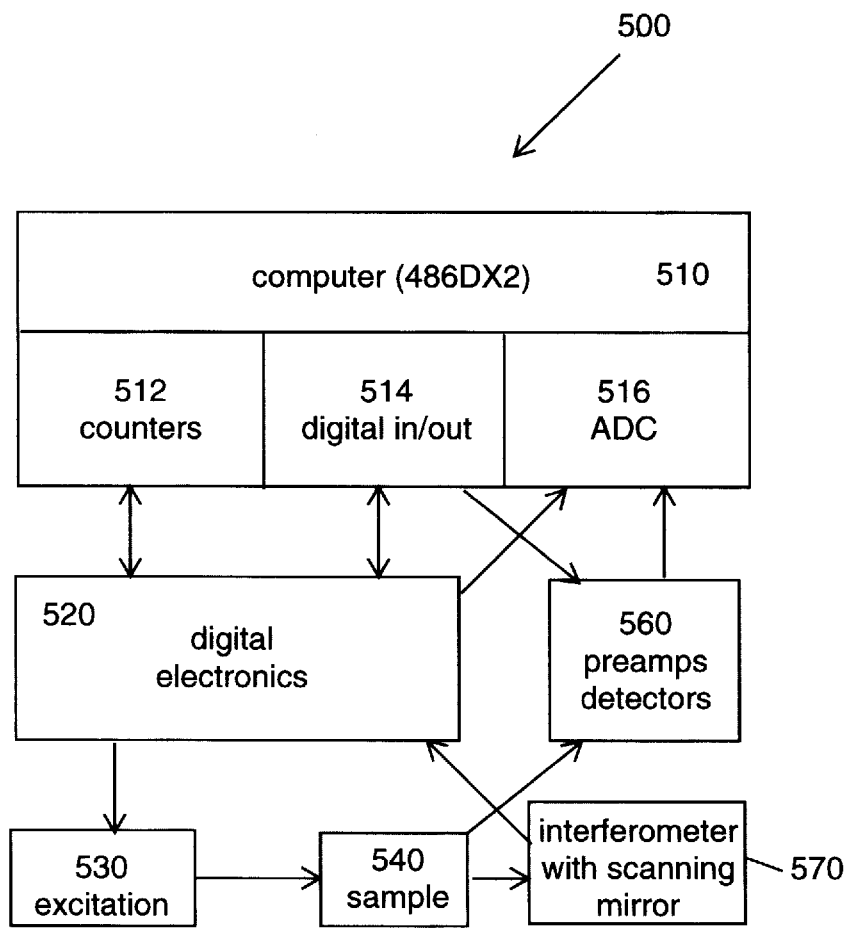
FIG. 5a shows an overview of the experimental set-up used in the subject invention.

FIG. 5a shows a block diagram of the experimental set-up 50 used in the subject invention. The interferometer 550 (in our set-up) is a DA8 spectrometer from BOMEM. The combination of excitation source 530, sample 540, interferometer 550, and detector(s) with pre-amplifier(s) 560 can be equivalent to setups using prior art techniques. The excitation source 530 can be a pulse Nd:YAG laser. The sample 540 can be a rare-earth activated crystal such as but not limited to Nd:KLiYF$_5$. The detector/pre-amplifier combination(s) 560 can be purchased commercially. The digital electronics 520 consisting of standard logic integrated circuits(IC) on a printed circuit board does the recording of the mirror speed, a number of pulse shaping functions, and some error checking. The software program executed by the computer 510 organizes the operation of the setup 500.

The algorithm and flow chart steps used in operating the experimental set-up of FIG. 5a will be described in reference to FIGS. 5b and 5c after the description of FIG. 6.

Figure 6:
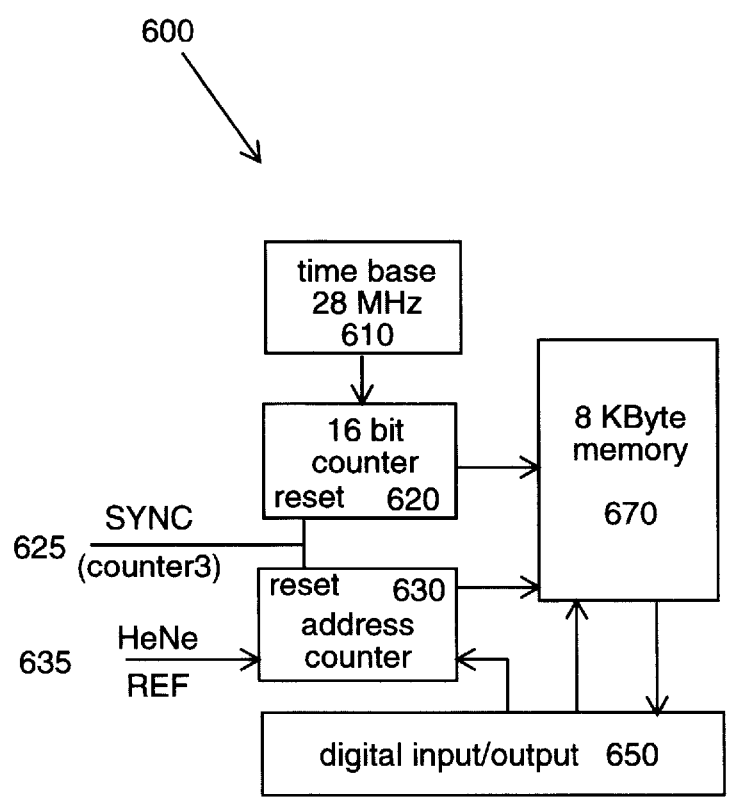
FIG. 6 shows a block diagram of the speed recording electronics of the subject invention.

FIG. 6 shows a block diagram 600 of the speed recording electronics, which includes a time base 610 such as a quartz oscillator IC, a 16 bit counter 620 such as four Motorola MC74HC161 ICs, an address counter 630 such as five Motorola MC74HC161 chips, SYNC 625 and REF 635 which correspond to 130 and 120 respectively that where previously discussed, a digital input/output 650 which corresponds to part of 514 previously discussed, and a storage memory such as a 128 KByte MCM 6226BWJ20 IC from Motorola.

Referring to FIG. 6, quartz stabilized time base 610 of 28.332 MHz allows a timing accuracy of 35 ns. A 16-bit counter 620 measures the time following a SYNC pulse 625 which has a known relation to the excitation of the sample. The counter 620 overflows every 2.3 ms allowing an unambiguous detection of mirror speeds as slow as 0.015 cm/s. Every time a HeNe reference pulse 635 arrives, the counter value is stored in a static memory chip 640, and the address used for storing is incremented at counter 630. After recording the mirror speed for a sufficient amount of time, the data is read under software control using digital input and output 650. At a typical mirror speed of 0.3 cm/s, where alignment is stable and the speed variations are smallest (for our DA8), the time between HeNe reference pulses 635 is 105 µs, which can be measured with a relative accuracy of 0.33× $10^{-3}$. For smoothly varying mirror speed, one can expect the results of the cubic spline interpolation, i. e. the path-length-difference values of the sample locations, to have an accuracy of 0.33×$10^{-3}$ fringes. For comparison, the FTS600 step-scan research grade FT-IR from Bio-Rad specifies a positional accuracy of 0.001 HeNe fringes and Brukers' instruments specify mirror stabilization to ≦1.5 nm (i.e. 0.005 HeNe fringes).

Figure 5B:
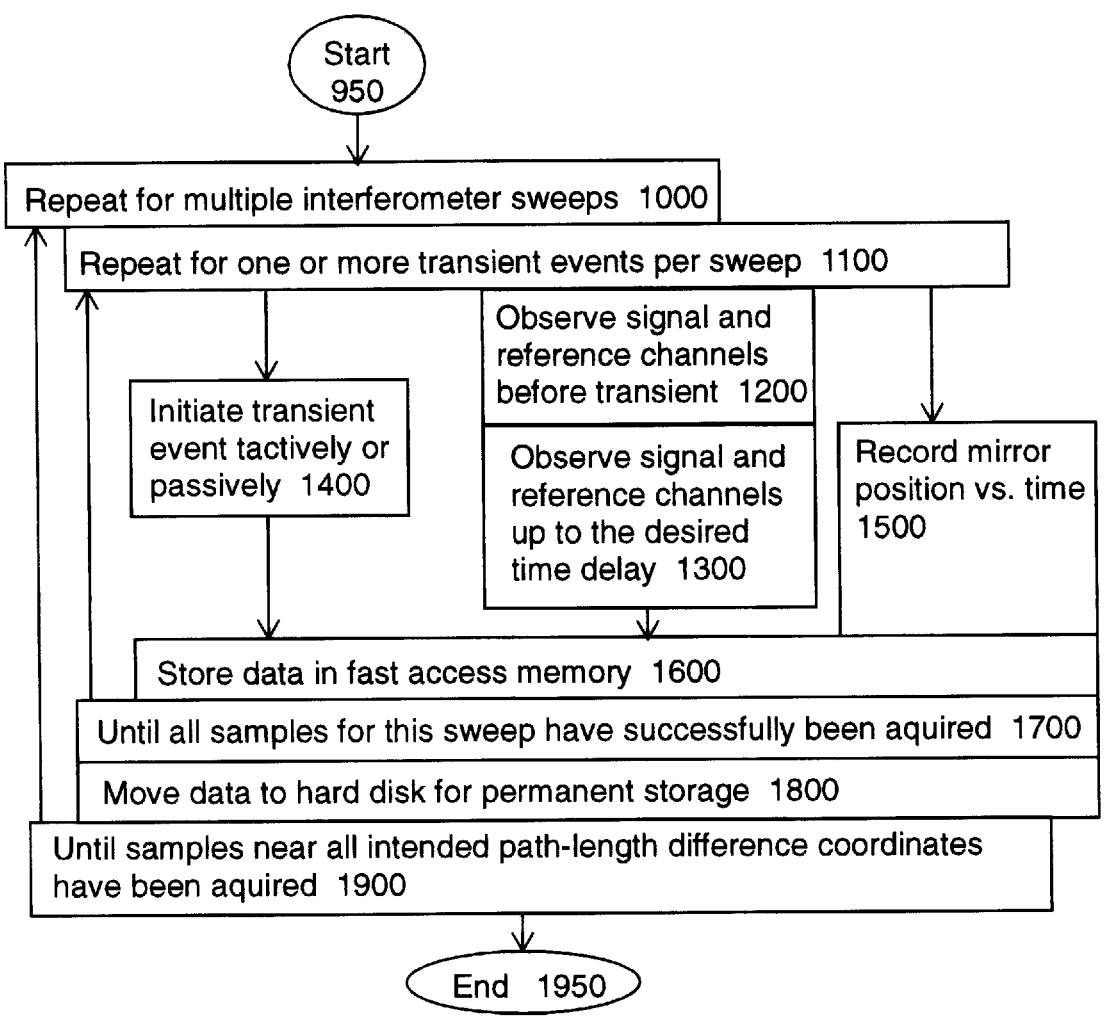

FIG. 5b shows the data acquisition program steps for the overview set-up of FIG. 5a. The software program can be run on a PC(personal computer) 510(FIG. 5a) such as but not limited to an IBM compatible 486DX or Pentium. The data acquisition program represented by steps 1000 to 1900 in FIG. 5b synchronizes the transient initiation, interferogram and speed recording, and periodic error checking with the motion of the scanning mirror. Program steps 1000 and 1900 are the beginning and the end, respectively, of the main data acquisition loop. The program cycles through this loop once for each sweep of the interferometer 550. Program step 1050 summarizes all efforts undertaken to track the motion of the interferometer mirror with the goal to recognize the beginnings of each sweep. During the mirror sweeps, the inner program loop, comprises of the steps 1100 to 1700, is executed. Each cycle of this inner loop handles one transient event. By means of one of the counters 512, certain REF pulses 121 are selected. Program step 1150 represents this selection, the subsequent waiting period 135, and the initiation of the SYNC signal 130. The SYNC signal is followed by three parallel processes comprised of step 1400, steps 1200 and 1300, and step 1500. The acquisition of mirror speed information 1500 spans the entire time period of interferogram data acquisition before 1200 and after 1300 the initiation of the initiation of the transient event 1400. After the transient, all acquired data is stored in fast access memory 1600. Certain error checks can be performed at this point. Steps 1100 and 1700 are repeated until the mirror sweep reaches its end. Now there is time to move the data to permanent storage and to perform more error checks. Step 1900 checks for the need to acquire more data and, if positive, causes the entire sequence to be repeated.

Figure 5C:
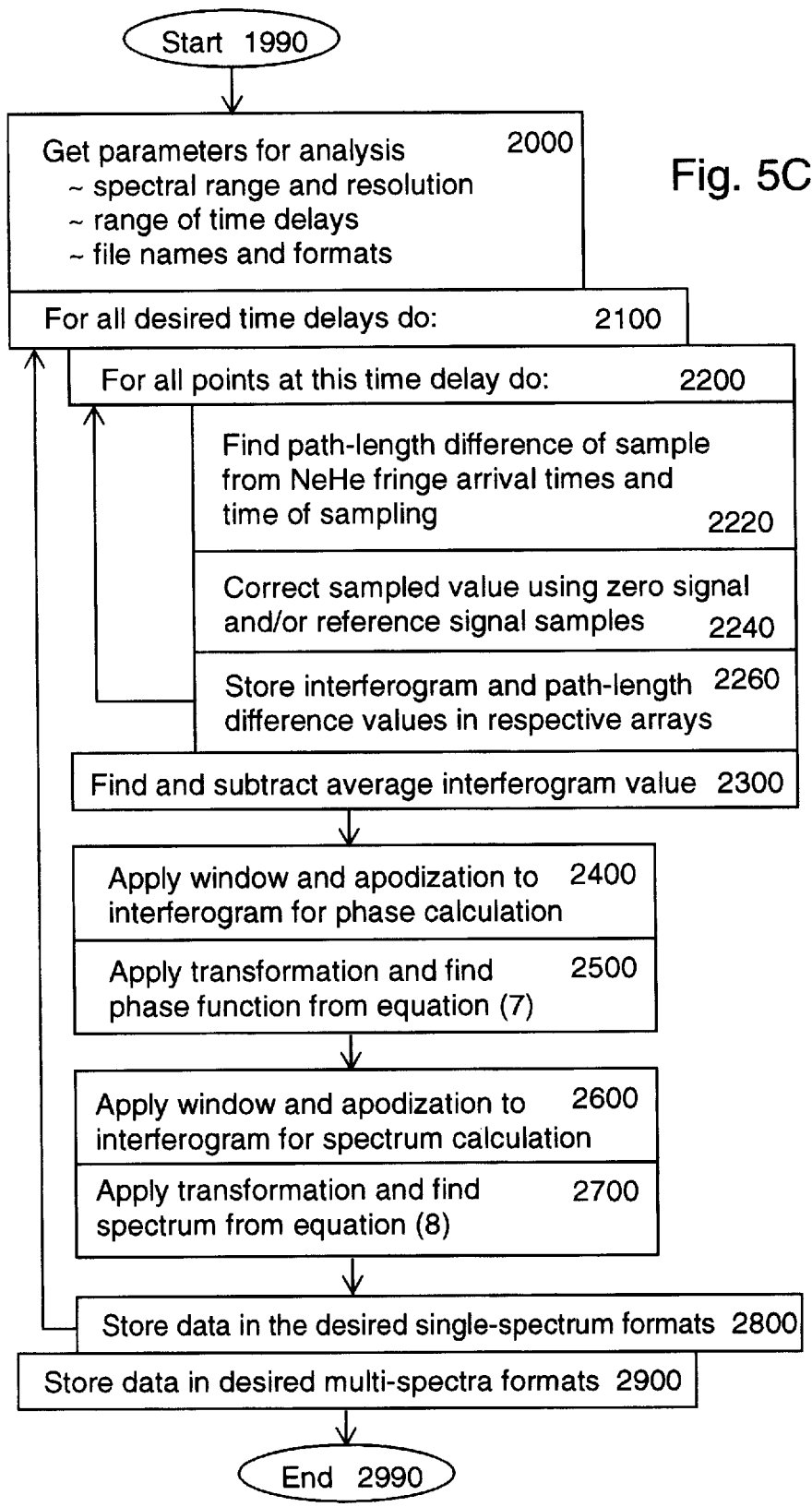

FIG. 5c is the analysis program for the data obtained with the experimental set-up of FIG. 5a. The analysis program of FIG. 5c evaluates the speed information and finds the phase corrected spectra according to Eq. 8. The FIG. 5c program also runs on a SUN workstation. Step 2000 is the input of parameters describing the desired results for this analysis run, i.e. the spectral range and resolution, the range of delay times, and names and formats of the output files. It follows the loop(steps 2100 through 2800) cycling through all requested delay times calculating one spectrum per cycle. Step 2100 organizes this loop. The loop consisting of steps 2200 through 2260 extracts the interferogram information from the input file. Step 2220 reads the mirror speed information corresponding to the current sample and finds its path-length difference coordinate. The intensity coordinate is prepared in step 2240. Both coordinates are stored for subsequent use in step 2260. After cycling through the entire input file and thus preparing all interferogram points for the current delay time, step 2300 removes the constant component from the interferogram to reduce numerical noise. In step 2400, windowing and apodization functions are applied to the interferogram suited for the phase calculation(next step). This step can be similar to an equivalent step in prior-art analysis techniques. Step 2500 uses equation(7) to transform the data resulting in the phase function. Step 2600 again applies windowing apodization functions to the interferogram now suitable for the calculation of the spectrum of interest. Step 2700 applies the transformation given by equation(8). The data for the current delay time, i.e. the spectrum, the interferogram, and/or the phase function, can now be stored as requested(step 2800). This completes the analysis of this time slot. The loop 2100 through 2800 is repeated until all requested time slots have been analyzed. A collection of data from all time delays can be stored in step 2900 is so requested.

A number of experiments were performed to test the performance of our implementation set-up of FIG. 5a. First, a multi-line Ar+laser beam was directed into the spectrometer by an acousto-optical (AO) modulator in 800 μs long pulses and onto a piece of paper. The scattered light passed a 1.5 mm aperture and a resolution of 0.2 cm$^{-1}$ was chosen.

Figure 7:
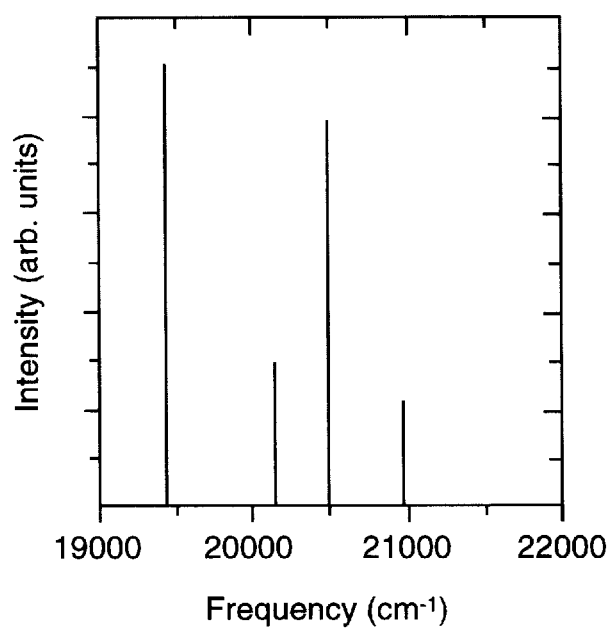

FIG. 7 shows a spectrum graph of a multi-line Ar+laser, set to medium power and chopped by an acousto-optical modulator, taken 10 μs after beam turn-on. The spectrum shows perfect frequency accuracy, good signal to noise, and no periodic artifacts. We observe four lines at the chosen laser power level. The estimated center frequencies differ from those obtained with cw measurements using the same external set-up and the Bomen DA8 acquisition tools by less than 0.1 cm$^{-1}$. The uncertainty in relative peak heights represented in Table I, as determined by comparison with a 100 scan cw measurement, was only slightly more for time-resolved than for a single scan cw-measurements.

TABLE I

Relative strengths of Ar+ laser lines measured in cw and time-resolved regimes.

| Line | one scan TRFTS | one scan CW | 100 scans CW |
| --- | --- | --- | --- |
| 1 | 1.14 | 0.90 | 0.98 |
| 2 | 0.37 | 0.41 | 0.44 |
| 3 | 1 | 0.93 | 1* |
| 4 | 0.27 | 0.18 | 0.19 |

*This line intensity was used for normalizing the third and fourth columns.

Transient pointing instabilities of the relatively slow AO modulator could be responsible. Another common problem in narrow line emission measurements using Fourier spectroscopy is the occurrence of phase errors in regions without signal. Evidence for phase errors in both timeresolved and cw spectra is revealed in FIG. 8 by slight asymmetries and negative features near one of the lines.

Figure 8:
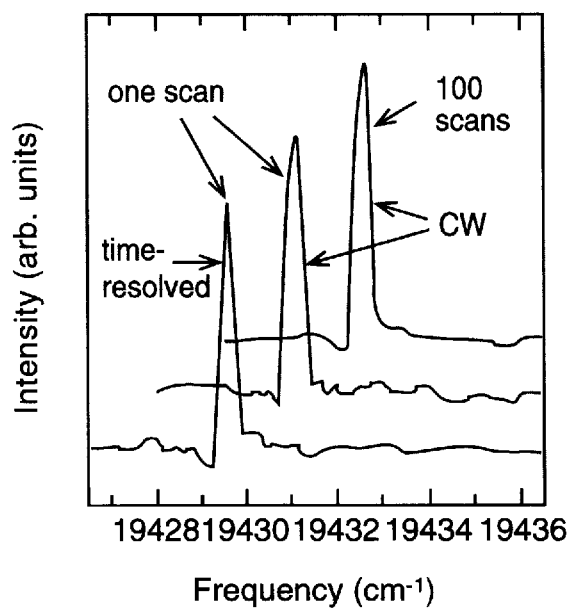
FIG. 8 shows spectra of one of the $Ar^+$ laser lines measured in time-resolved and cw mode.

FIG. 8 shows part of a spectrum of a single Ar$^+$ laser line measured in time-resolved and cw mode. The slight asymmetries arise from imperfections in the phase characterization—a common problem with narrow-width emission sources. The time-resolved spectrum has about the same signal to noise ratio as the single-scan cw spectrum. There are certain techniques to improve the characterization of the phase function. However, we chose to use only the standard phase correction to show the potential of our method. The multi-line Ar+laser experiments (see FIGS. 7 and 8) using event-locked TRFTS with three samples per HeNe fringe at uneven intervals demonstrates a quality similar to the usual cw spectrum taken under identical conditions (except the pulsing of the laser beam and four samples per fringe).

Figure 9:
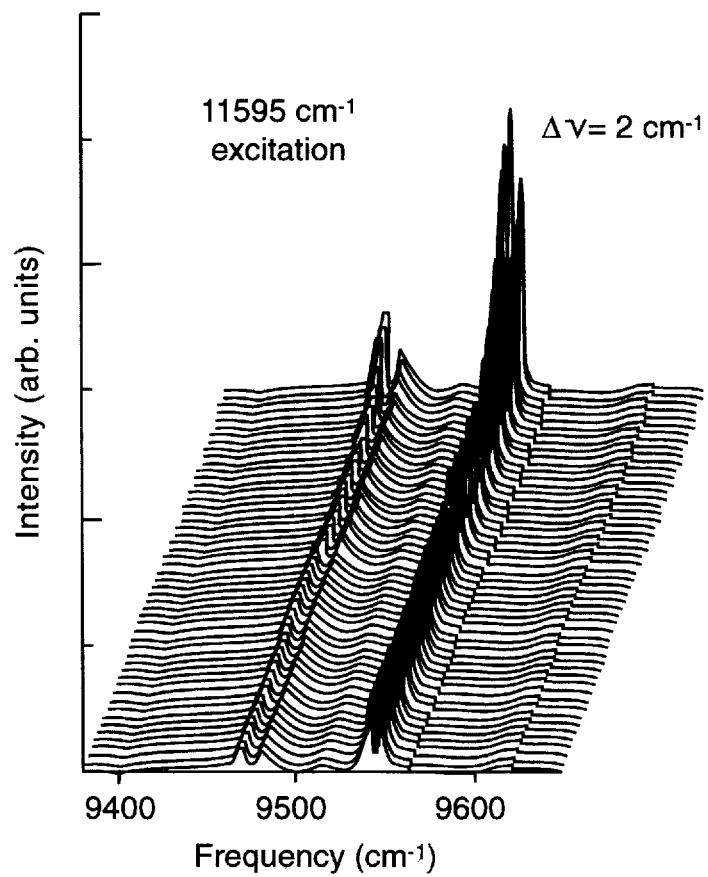
FIG. 9 shows time resolved $^4F_{3/2}$ to $^4I_{11/2}$ emission spectra for $Nd^{3+}$ ions in the crystal $KLiYF_5$ at 80K.

For a more realistic test with a natural transient phenomenon, we excited the laser crystal Nd:KLiYF$_5$) with a DCM dye laser pumped by a Q-switched and doubled Nd:YAG laser. This crystal provides two crystallographic sites for the Nd$^{3+}$ ions.[12] Ions in the different sites can be separately excited and have distinguishable photoluminescence spectra. FIG. 9 shows a time resolved $^4F_{3/2}$ to $^4I_{11/2}$ emission spectra (portion) for Nd:KLiYF$_5$ at 80K. The temporal spacing between the spectra is 11 μs. FIG. 9 shows a sequence of photoluminescence spectra at a sample temperature of 80K with a resolution of 1 cm$^{-1}$. After short-pulse excitation at 15991 cm$^{-1}$ ($^2H_{11/2}$), the ions relax rapidly towards the $^4F_{3/2}$ manifold, from which the observed emission originates. All spectra were taken in a single experiment without averaging at time intervals of 11 μs starting 8 μs after the excitation. Four distinguishable pairs of lines are shown. The left line in each pair belongs to the excited site and shows strong emission at early times. Energy is transferred non-radiatively to ions in the nonexcited site, resulting in an increase in their emission during the first 50 µs. At long times, the excited populations for the two sites approach an equilibrium, and the lines within each pair have approximately equal strength. The spectra show good signal to noise ratio, no phase errors, and no artifacts.

Another example with higher demands on the time-resolution is the crystal (Yb, Ho):$KYF_4$, which has been recently studied as an IR-pumped up-conversion laser at green wavelengths in: R. J. Thrash, R. H. Jarman, B. H. T. Chai, and A. Pham, "Upconversion Gree Laser Operation of Yb, Ho:$KYF_4$" in Compact Blue-Green Lasers, 1994 Technical Digest Series (Optical Society of America, Washington, D.C., 1994), Vol. 1, pp 73–75. The subject inventors studied various Ho to Yb back-transfer pathways in C. J. Schwindt, H. Weidner, J. Donahue, and R. E. Peale, "Time-Resolved Fourier Spectroscopy of Energy Transfer in (Ho, Yb):KYF4", in OSA Proceedings of Advanced Solid State Lasers edited by S A Payne and C. R. Pollock (Optical Society of America, Washington, D.C. 1996), pp.534–538.

FIG. 10a shows an 80K emission spectrum of $Ho^{3+}$ and $Yb^{3+}$ emission in $KYF_4$. The 1 µs steps show the rapid energy transfer from $Ho^{3+}$ to $Yb^{3+}$ ions. FIG. 10 shows the emission in the near IR after excitation of a sub-group of the Ho dopant ions (class I) to the $^5F_5$ manifold. The spectra span the time interval from 1 to 43 µs (back to front) after excitation in 1 µs steps. Due to the limited sampling rate of our current ADC ($\leq$98 kHz), the data acquisition was split into 11 groups spreading the initial delay over the range from 1 to 11 µs. Degradation of the dye in the exciting laser and scattering on ice forming on the sample (80K) during the course of the experiment may be responsible for a small reduction of total luminescence intensity, which is seen in FIG. 10 as the slight oscillation in the Yb peak intensity after collating the various time delays into one plot. To demonstrate the unmodified performance of our system, no correction has been attempted, though our analysis software could easily do so. Without averaging, the spectra have a signal-to-noise ratio adequate for the analysis of rise and decay times and the energy transfer rate.

FIG. 10b shows a graph of intensity versus frequency for the 3 µm emission of $Er^{3+}$:YLF to show that our implementation also works in the mid IR(infrared) spectral range.

The following experiment shows that our implementation also works well in the far-infrared. Bulk Ge which is lightly p-doped has been shown to emit far-IR radiation when exposed to crossed electric and magnetic fields. The emission typically lasts only 300 ns which is beyond our current time-resolution. However, using a slow 4K bolometer we measured the time-integrated spectrum of this pulsed source. The spectrum obtained from a single scan with a resolution of 0.2 $cm^{-1}$ is plotted in FIG. 11. It shows a Far-infrared emission from a pulsed p-Ge source at a resolution of 0.2 $cm^{-1}$. FIG. 11 shows several modes which can be explained in terms of multiple total internal reflections in the Ge crystal. The signal to noise ratio is quite good considering the high resolution, no averaging, and the fact that no reference detector was used.

The invention can have direct applications in time-resolved emission, transmission, scattering and reflection measurements using a triggered excitation source FIG. 12 and a free-running excitation source FIG. 13.

FIG. 12 is a flow chart of the operating steps 3000 to 3500 which include the synchronization steps of FIG. 3 during a measurement with a triggered excitation source. The operating steps begin at start step 2995. Under step 3000 of FIG. 12, the interferometer 550(FIG. 5a) is set to scan continuously and does so independently from the rest of the experimental set-up 500(FIG. 5a). While scanning, the interferometer 550(FIG. 5a) generates fringe signals 120 (FIG. 3). Under step 3100 of FIG. 12, one counter 512(FIG. 5a) selects certain fringes 121(FIG. 3) in a manner that leaves a desired time between consecutive selections but assures after multiple sweeps a sufficient number of approximately evenly spaced samples. A second counter 512(FIG. 5a) counts down a certain delay time 135(FIG. 3) before issuing the SYNC pulse 130(FIG. 3). Referring to FIG. 12, the following four process steps occur now in parallel: Step 3220 Recording of the mirror speed 110(FIG. 3), Step 3240 initiation of pre-trigger and trigger signals for the excitation source, 3250 the transient event at the sample, and Step 3260 the digitizing of the signal(interferogram) and reference (optional) channels. After completion of the data acquisition for the current event, the data is checked for problems/errors at Step 3300. The problems/errors include but are not limited to wrong mirror speed, no signal or too much signal, and the like. In the case of successful data acquisition, the data is saved/stored at step 3400 for later analysis. Under Step 3500, the procedure of steps 3000 to 3400 is repeated until all selected data is acquired, which occurs at final step 3600.

The subject invention of event locked TRFTS eliminates the requirement of sampling the interferogram at evenly spaced path-length difference positions. Sampling instead at accurate times avoids artifacts arising from mirror speed variations and makes the experiment more flexible. The sampling times can be chosen arbitrarily and are not tied to the available choice of mirror speeds. This also means the mirror speed can be chosen to suit other demands. The ability to sample at more or less arbitrary path-length differences has applications beyond interleaved data acquisition and may improve the performance of systems with one transient event per fringe (non-interleaved). Decoupling the timing from the HeNe fringe pattern also allows measurement of events with random temporal spacing.

We have shown the performance of our current implementation with a time resolution of 1 µs over a wide frequency range from far-infrared to visible at high resolutions. The method does not have any principle restriction for frequency range or spectral resolution. The addition of our set-up to any continuous-scan interferometer would enable time-resolved measurements over the entire frequency-resolution range this machine has for cw measurements. The signal to noise performance would depend on the particular transient event under investigation (as it does for step-scan interferometers). For a few selected cases, we have shown results with quality similar to cw measurements. Time resolution is currently limited by the sampling time of the ADC and the bandwidth of our pre-amplifier/detector combinations. Further improvements can include up to about 10 ns resolution by using new high-speed 12 bit ADCs and appropriate amplifiers/detectors.

Direct applications of the subject invention can include use of free-running excitation sources(mirror position at all excitations is passively measured-not actively controlled). FIG. 13 is a flow chart of the operating steps of the invention. Referring to FIG. 13, event locked data acquisition with a free-running excitation source cannot be described by a linear sequence of steps. The excitation source 4200 and the interferometer 4000 operate independently with no attempt(or means) of synchronization. The goal remains to acquire all data necessary to construct an(unevenly spaced) interferogram at each desired time delay. Without means to predict the occurrence of the SYNC pulses, the fringe counter and speed recording 4100 and the sampling of the ADC(4300) need to proceed continuously.

After a SYNC pulse(and with it a transient event) actually occurred, the appropriate data are saved/stored(4400). The process steps 4000 to 4400 continue under step 4500 until a sufficient number of transient events have been observed. This number can be chosen larger than measurements with a triggered source to assure a sufficient density of data points over the entire length of the interferogram.

FIG. 14 shows the overall operating algorithm steps required to prepare and execute a time-resolved measurement using the presently preferred embodiment. The operation is organized into steps with different levels of specificity. First, the software needs information about the interferometer, 5000, used and excitation source, 5100, used. These data are then used in the following dialog 5200 to check the input parameters for feasibility. From the timing and spectral parameters set in step 5200, the software determines the times and positions of intended interferogram samples and hence the number of samples needed. However, before the actual measurement 5400 can be started, step 5300 is needed to check the scanning motion of the interferometer and the signal levels. During the measurement 5400, the software controls the entire hardware(except the interferometer) without user interaction. After the data acquisition is complete, the data analysis 5500, i.e. the transformation into spectra, can be executed at anytime.

Indirect applications of the subject invention include measuring the spectra of pulsed sources(without resolving time-development), such as Raman scattering and pulsed lasers. Examples of the indirect application where previously shown and described in reference to Figures at wavelengths near the bandgap by an AC electric field simultaneously with the modulation of the reflected light. The data acquisition can be devised so that the difference signal is measured, as described by Michael J. Green, Barbara J. Barner, and Robert M. Corn, in Rev. Science Instruments, Vol. 62, pp. 1426–1430(1991). The event locked method can be adapted to this scheme. Time-dependent transient events are a special case of modulating the signal from the sample. More generally, an arbitrary but repeatable modulation can be applied to the sample. This represents a second modulation of the light(the first one is done by the interferometer). Hence, the name "double modulation." The second modulation introduces a second free parameter which is called the phase of the modulation. In the case of a time-dependent transient event, as discussed earlier, this free parameter is time. The task of event-locked Fourier spectroscopy is now to acquire the interferogram information in fixed relation to the phase information at different phases of the modulation (as it does for time-dependent transient events). There are two ways of synchronizing the digitization of the interferogram to the phase of the modulation. The more simple one is to use a modulation with a fixed relation to time. Thus, sampling at certain times corresponds to sampling at certain phases. The second way requires electrical pulses to be derived from the modulation process indicating the need to sample. These pulses trigger the ADC and hence assure the fixed relation between modulation phase and data acquisition.

Although the preferred embodiment describes using a Michelson Interferometer, the invention can be applied to other interferometers such as but not limited to Fabry Perot interferometers and the like.

The perturbations or excitations can be generated by sources such as but not limited to: pulsed lasers, electric fields, electric currents, pressure sources(acoustics), heaters, and magnetic fields.

Although the embodiments describe a separate detector, the sample can itself be a detector. Using the sample itself as the detector can be done utilizing physical effects such as but not limited to photo conductivity where the resistance of the sample is changed and measured electrically with an ohm meter and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of time-resolving Fourier-transform spectroscopy which allows sampling an interferogram at unevenly spaced path-length differences, comprising the steps of:

(a) generating time-varying electromagnetic radiation signals from a sample;

(b) passing the radiation from the sample through a continuously scanning interferometer to form interferometer-modulated radiation;

(c) receiving the interferometer-modulated radiation at a detector to form a detector signal;

(d) recording interferogram data points from the detector signal in fixed temporal relation to the generation of the time-varying radiation signal;

(e) avoiding noise and artifacts caused by scan speed variations in the interferometer; and (f) transforming a resulting interferogram into a spectrum.

2. The method of time-resolving Fourier-transform spectroscopy of claim 1, wherein the interferometer includes:

a continuously scanning Michelson interferometer.

3. The method of time-resolving Fourier-transform spectroscopy of claim 1, wherein the time-varying electromagnetic radiation step(a) is generated by:

triggered impulse perturbations.

4. The method of time-resolving Fourier-transform spectroscopy of claim 1, wherein the time-varying electromagnetic radiation step(a) is generated by:

impulse perturbations occurring at random but measured times.

5. The method of time-resolving Fourier-transform spectroscopy of claim 1, wherein the time-varying electromagnetic radiation step(a) is generated by:

a periodic modulation; and the interferogram data points of step(d) are recorded in fixed relation to the phase of this modulation.

6. The method of time-resolving Fourier-transform spectroscopy of claim 1, wherein the noise avoiding step(e) includes:

locking acquisition of the interferogram data points to a temporal synchronization event instead of locking the acquisition to a spatial fringe pattern.

7. The method of time-resolving Fourier-transform spectroscopy of claim 1, wherein the transforming step(f) includes:

transforming the resulting interferogram into spectral data by means of a least squares fit of harmonic functions to the interferogram data points.

8. The method of time-resolving Fourier-transform spectroscopy of claim 1, wherein the noise avoiding step(e) includes:

using recorded interferometer scan speeds to determine the spatial position of the digitized interferogram points.

9. A method of time-resolving Fourier-transform spectroscopy which allows sampling of the interferogram at unevenly spaced path-length difference intervals, comprising the steps of:

(a) passing electromagnetic radiation through a continuously scanning interferometer to form interferometer-modulated radiation;

(b) irradiating a sample with the interferometer modulated radiation;

(c) generating a time-varying perturbation at the irradiated sample to form a double modulated signal;

(d) passing the double modulated signal to a detector to form a detector signal;

(e) recording interferogram data points from the detector signal in fixed temporal relation to the generation of the time-varying perturbation;

(f) avoiding noise and artifacts caused by scan speed variations in the interferometer; and (g) transforming a resulting interferogram into spectral data.

10. The method of time-resolving Fourier-transform spectroscopy of claim 9, wherein the interferometer includes:

a continuously scanning Michelson interferometer.

11. The method of time-resolving Fourier-transform spectroscopy of claim 9, wherein step(c) is generated by:

triggered impulse perturbations.

12. The method of time-resolving Fourier-transform spectroscopy of claim 9, wherein step(c) is generated by:

impulse perturbations occurring at random but measured times.

13. The method of time-resolving Fourier-transform spectroscopy of claim 9, wherein step(c) is generated by:

a periodic modulation; and the interferogram data points step(e) are recorded in fixed relation to the phase of the modulation.

14. The method of time-resolving Fourier-transform spectroscopy of claim 9, wherein the noise avoiding step(f) includes:

locking the acquisition of the interferogram data points to a temporal synchronization event rather than locking to a spatial fringe pattern.

15. The method of time-resolving Fourier-transform spectroscopy of claim 9, wherein the noise avoiding step(f) includes:

using a record of the interferometer scan speeds to determine the spatial position of the digitized interferograin data points.

16. The method of time-resolving Fourier-transform spectroscopy of claim 9, wherein the transforming step(g) includes:

a least squares fit of harmonic functions to the interferogram data.

17. The method of time-resolving Fourier-transform spectroscopy of claim 1, wherein the interferometer includes:

a continuously scanning Fabry-Perot interferometer.

18. The method of time-resolving Fourier-transform spectroscopy of claim 9, wherein the interferometer includes:

a continuously scanning Fabry-Perot interferometer.

19. The method of time-resolving Fourier-transform spectroscopy of claim 9, wherein the detector of step(d) is the sample.

20. The method of time-resolving Fourier-transform spectroscopy of claim 9, wherein the detector of step(d) includes:

a sensor of electromagnetic energy separate from the sample.

* * * * *